P. ERICKSON.
CUTTER GUARD.
APPLICATION FILED MAR. 9, 1914.
1,122,487.
Patented Dec. 29, 1914.
2 SHEETS—SHEET 1.
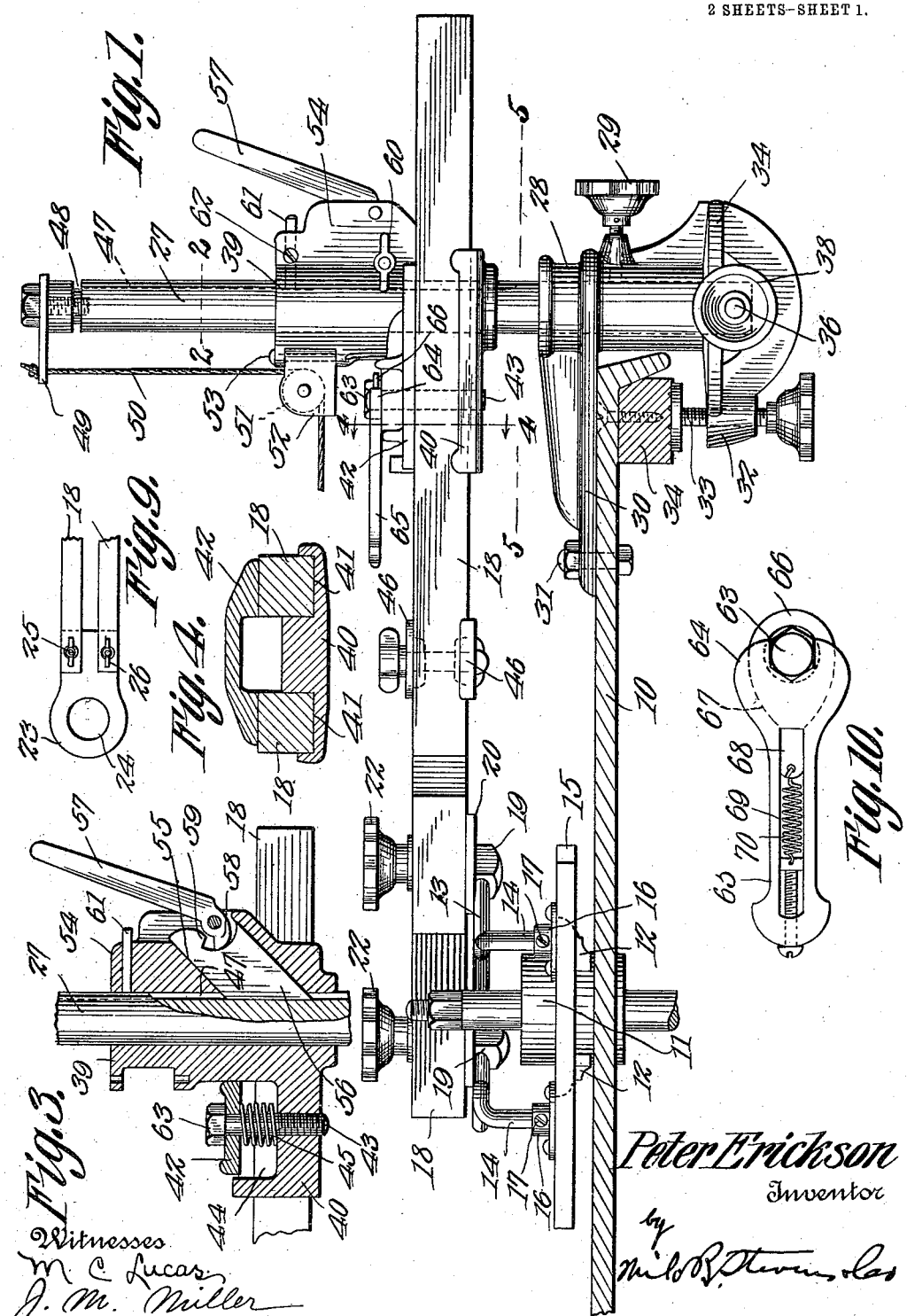
Peter Erickson
Inventor
Witnesses
M. C. Lucas
J. M. Miller
Attorney

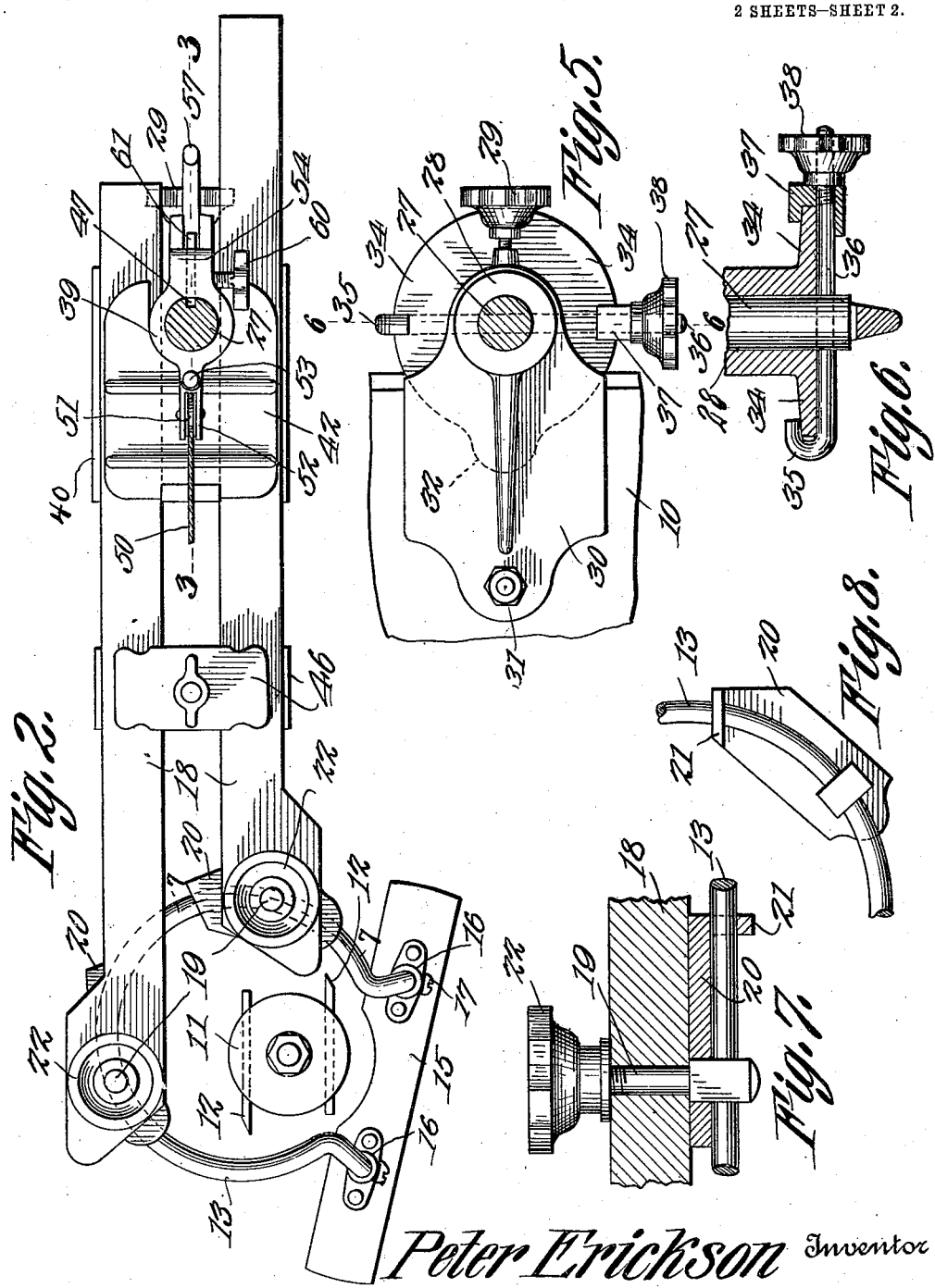

UNITED STATES PATENT OFFICE.

PETER ERICKSON, OF CHICAGO, ILLINOIS.

CUTTER-GUARD.

1,122,487.

Specification of Letters Patent. Patented Dec. 29, 1914.

Application filed March 9, 1914. Serial No. 823,418.

*To all whom it may concern:*

Be it known that I, PETER ERICKSON, a citizen of the United States, residing at Chicago, in the county of Cook and State of Illinois, have invented certain new and useful Improvements in Cutter-Guards, of which the following is a specification.

This invention relates to improvements in guards for shapers and other wood-working machines for preventing injury to the operator from contact with the cutter.

It is the object of the present invention to provide a simple and efficient cutter guard which is capable of a wide range of adjustment, and to this end the invention consists in a novel combination and arrangement of parts to be hereinafter described and claimed, reference being had to the accompanying drawings, in which—

Figure 1 is an elevation of the guard in operative position; Fig. 2 is a plan view partly in section, the section being on the line 2—2 of Fig. 1; Fig. 3 is a section on the line 3—3 of Fig. 2; Fig. 4 is a cross-section on the line 4—4 of Fig. 1; Fig. 5 is a horizontal section on the line 5—5 of Fig. 1; Fig. 6 is a cross-section on the line 6—6 of Fig. 5; Fig. 7 is a cross-section on the line 7—7 of Fig. 2; Fig. 8 is an inverted plan view of the cutter guard fastening shown in Fig. 7; Fig. 9 is a plan view showing a modified form of cutter guard, and Fig. 10 is a plan view showing a wrench for tightening one of the clamping bolts.

Referring specifically to the drawings, 10 denotes the work table of a shaper or other wood-working machine having a vertical cutter head 11 armed with knives 12 which operate above the table in the ordinary manner. The guard for protecting the operator's hand from being injured by the knives comprises a rod 13 which is bent into substantially circular shape to encircle the cutter head. The ends of the rod have downward bends 14 carrying at their lower ends a presser plate 15. On top of this plate are secured socket pieces 16 into which the lower ends of the bends 14 extend and are held by set screws 17. The knives are not concealed from view by the guard as only the presser plate is in front of the knives, the rod 13 encircling the cutter head above the knives.

The guard herein described is carried by two laterally spaced, horizontal arms 18. Bolts 19 pass vertically through these arms at their outer ends, the heads of the bolts being beneath the arms and having transverse apertures through which the rod 13 passes. Between the bolt heads and the under side of the arms are located washers 20 having depending end flanges 21 provided with apertures through which the rod passes. The bolts project above the top of the arms and carry hand nuts 22, which latter, when tightened up, securely clamp the rod in place. Upon backing the hand nuts, the rod may be shifted horizontally to place the presser plate 15 in different positions relative to the knives 12.

Fig. 9 shows a cutter guard comprising a plate 23 surrounding the cutter head 11 and having a central opening 24 in which the cutter head works. This form of guard is fastened to the arms 18 by bolts 25 and thumb screws 26. The arms are adjustable in the direction of their length to permit the exchange of guards.

Engageable with the edge of the table 10 is a support for a vertical spindle or shaft 27 carrying a holder for the arms 18. This support comprises a tubular member 28 in which the spindle seats and is rigidly held by a set screw 29. The member 28 has an outstanding horizontal plate 30 engaging the top of the table and made fast thereto by a bolt 31. From the bottom of the member extends a stationary jaw 32 carrying clamping screw 33 engageable with a cleat 34 on the under side of the table. Upon tightening up the bolt 31 and the screw 33, the member 28 is securely clamped to the table, and it can be readily removed upon removing said bolt and slackening the screw.

The lower end of the member 28 has outstanding flanges 34 on opposite sides. One of these flanges is engaged by the hook end 35 of a bolt 36, and the other flange is engaged by a washer 37 having a groove in which said flange seats. The bolt passes through the washer and has a hand nut 38 adapted to be screwed against the washer. The bolt also passes through a transverse hole in the spindle 27, whereby the latter is prevented from turning.

The holder for the arms 18 comprises a tubular member 39 which is adjustably mounted on the spindle 27. The lower end of the member has an outstanding bracket arm 40 provided with grooves or seats 41 for the arms 18, said grooves being on opposite sides of the member so that the arms clear the spindle. The arms are clamped to the bracket by a top clamping plate 42 and a bolt 43 passing through said plate and that portion of the bracket which lies between the arms, said intermediate portion of the bracket having a recess 44 to accommodate a spring 45 coiled around the bolt 43 and pressing against the under side of the plate 42. When the bolt 43 is loosened, the spring lifts the plate 42 to release the arms. The arms 18, intermediate their ends, are also engaged by top and bottom clamping plates 46 for holding the same rigid.

The spindle 27 has a longitudinal groove 47, and at the top a circumferential groove 48 in communication therewith. To the top of the spindle is also secured an arm 49 to which is made fast a hoisting line 50, which extends downward and passes under a pulley 51 carried by a support 52 which is pivoted at 53 to the member 39 to swing to either side thereof. Upon pulling on the lower end of the line, the member 39 slides upward on the spindle.

The member 39 has a rear enlargement 54 provided with a downwardly inclined recess 55 in which is slidably mounted a key 56 which is designed to seat in the groove 47 to prevent rotation of the member. In the outer end of the recess is fulcrumed a lever 57 having a hooked inner end 58 adapted to engage a hook 59 on the outer end of the key for withdrawing the latter from the groove 47. A set screw 60, threaded through the part 54, may be screwed against the key to lock the same in the spindle groove. The part 54 also carries a transverse pin 61 locked by a set screw 62 and seating in the spindle groove.

Upon withdrawing the key 56 from the groove 47, the member 39 may be slid upward on the spindle 27 by a pull on the line 50, and when the pin 61 reaches the groove 48, the member may be rotated on the spindle. The parts carried by the member may thus be swung horizontally across the table to bring the guard in proper position relative to the cutter head, and the guard may also be swung entirely clear of the table 10, and out of the way.

It will be noted that the hooked end 58 of the lever 57 is also cam-shaped to engage a similar shaped surface on the key 56. Thus, when the lever is swung upward, the key is tightly wedged against the spindle 27 and the member is locked not only against rotary movement, but also against longitudinal movement on the spindle and at the desired height.

The entire device can be removed from the table by removing the bolt 31 and backing the screw 33.

To facilitate the operation of the bolt 43, the head 63 of the same is fitted with a wrench comprising jaws 64 and a handle or shank 65. On the bolt head is rotatably mounted a washer 66 which seats in a groove 67 in the jaws. The washer has a projecting finger 68 which extends slidably into a longitudinal recess 69 in the wrench-handle and is connected to a spring 70 anchored in said recess. The wrench is always ready for use, and a pull on the handle backs the jaws from the bolt head so that they may be placed to take a new hold.

I claim:

1. A cutter guard comprising an encircling rod having downward ends, a presser plate carried by said downturned ends, a support for said rod in which the latter is slidably mounted, and means for locking the rod.

2. A cutter guard comprising an encircling rod having downward ends, a presser plate carried by said downturned ends, supporting arms, headed members carried by said arms and having apertures through which the rod passes, and means for fixing said members on the arms.

3. A cutter guard comprising an encircling rod having downward ends, a presser plate carried by said downturned ends, supporting arms, headed members carried by said arms and having apertures in which the rod is slidably mounted, and means for clamping the arms in the apertures.

4. A cutter guard comprising an encircling rod having downward ends, a presser plate carried by said downturned ends, supporting arms, headed members carried by said arms and having apertures through which the rod passes, washers between said members and the arms, said washers having end flanges provided with apertures through which the rod passes, and means for fixing said members on the arms.

5. The combination of a cutter guard, a holder for the guard, a spindle supporting the holder, a tubular member in which the spindle seats, said member having outstanding flanges on opposite sides, a washer seating against one of the flanged sides and having a groove in which the flange seats, a bolt passing through the member, the washer and the spindle, and having a hooked end engageable with the other flange, and means for securing the member to a support.

6. The combination of a cutter guard, arms supporting the guard, a holder for the arms comprising a tubular member having a bracket on opposite sides provided with grooves in which the arms seat, a clamping plate between which plate and the bracket the arms are held, clamping means for said plate, a spindle on which the tubular member is mounted, and a support for the spindle.

7. The combination of a cutter guard, a support for the guard, a spindle on which the support is mounted, said spindle having a longitudinal groove, a key carried by the support and adapted to seat in the groove, said key having a hooked outer end, and a lever carried by the support and having a hooked end engageable with the hooked end of the key, said lever also having a cam portion engageable with the key for jamming the same against the spindle.

In testimony whereof I affix my signature in presence of two witnesses.

PETER ERICKSON.

Witnesses:
S. J. LEHRER,
H. G. BATCHELOR.